United States Patent
Wu et al.

(10) Patent No.: US 8,247,104 B2
(45) Date of Patent: Aug. 21, 2012

(54) BATTERY COVER MECHANISM

(75) Inventors: Xi-Qiu Wu, Shenzhen (CN);
Guang-Xiang Zhang, Shenzhen (CN);
Cong-Ling Xiao, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 439 days.

(21) Appl. No.: 12/558,740

(22) Filed: Sep. 14, 2009

(65) Prior Publication Data

US 2010/0112426 A1 May 6, 2010

(30) Foreign Application Priority Data

Oct. 31, 2008 (CN) .......................... 2008 1 0305341

(51) Int. Cl.
*H01M 2/10* (2006.01)

(52) U.S. Cl. .......... 429/100; 429/97; 429/163; 429/175; 429/176

(58) Field of Classification Search .................... 429/97, 429/100, 163, 175, 176
See application file for complete search history.

(56) References Cited

U.S. PATENT DOCUMENTS

| | | | | |
|---|---|---|---|---|
| 7,488,555 B2 * | 2/2009 | Chen et al. | ..................... | 429/100 |
| 7,638,231 B2 * | 12/2009 | Kurosawa | ..................... | 429/97 |
| 7,700,224 B2 * | 4/2010 | Tsumura et al. | ............. | 429/100 |
| 7,713,657 B2 * | 5/2010 | Yamasaki et al. | ............. | 429/178 |
| 7,833,652 B2 * | 11/2010 | Nagano | ..................... | 429/97 |
| 7,838,142 B2 * | 11/2010 | Scheucher | ..................... | 429/99 |
| 7,914,919 B2 * | 3/2011 | Wang | ..................... | 429/100 |
| 7,917,185 B2 * | 3/2011 | Shi et al. | ..................... | 455/575.8 |
| 8,010,170 B2 * | 8/2011 | Shi et al. | ..................... | 455/575.1 |
| 8,025,994 B2 * | 9/2011 | Nishimaki et al. | ............. | 429/96 |
| 2009/0061296 A1 * | 3/2009 | Lee | ..................... | 429/100 |
| 2009/0286144 A1 * | 11/2009 | Wu | ..................... | 429/100 |
| 2010/0035136 A1 * | 2/2010 | Huang et al. | .................. | 429/100 |
| 2010/0086839 A1 * | 4/2010 | Wu et al. | ..................... | 429/97 |
| 2010/0086840 A1 * | 4/2010 | Shao | ..................... | 429/97 |
| 2010/0119923 A1 * | 5/2010 | Wu et al. | ..................... | 429/97 |
| 2010/0124697 A1 * | 5/2010 | Chen et al. | ..................... | 429/97 |
| 2010/0124698 A1 * | 5/2010 | Wu et al. | ..................... | 429/100 |
| 2010/0245659 A1 * | 9/2010 | Nam | ..................... | 348/372 |
| 2010/0330407 A1 * | 12/2010 | Lee | ..................... | 429/97 |
| 2011/0020681 A1 * | 1/2011 | Liu | ..................... | 429/97 |
| 2011/0020684 A1 * | 1/2011 | Liang et al. | ..................... | 429/100 |

* cited by examiner

*Primary Examiner* — Robert Hodge
(74) *Attorney, Agent, or Firm* — Altis Law Group, Inc.

(57) ABSTRACT

A battery cover mechanism for a portable electronic device includes a housing, a door, two elastic members and a holding unit, the housing defines a cutout, the door slidably engage with the cutout, the cutout is closed by the door with the elastic resisting the door, the door can be opened by external force and not be removed from the housing, thus, a battery can be assembled in the housing.

14 Claims, 4 Drawing Sheets

BATTERY COVER MECHANISM

CROSS-REFERENCE TO RELATED APPLICATION

This application is related to co-pending U.S. patent application Ser. No. 12/558,741, entitled "BATTERY COVER MECHANISM", by XI-QIU WU et al., which is the same assignee as the present application. The above-identified application is incorporated herein by reference.

BACKGROUND

1. Field of the Invention

The disclosure relates to battery cover mechanisms, particularly to a battery cover mechanism used in portable electronic devices.

2. Description of Related Art

Portable electronic devices such as mobile phones and personal digital assistants (PDAs) are widely used. When a battery is installed in the portable electronic device, the battery is generally shielded and fixed in place by a battery cover mechanism.

A commonly used battery cover mechanism includes a cover and a housing. The cover includes a pin at on one end and a protrusion at an opposite end. The housing defines a receiving hole and a holding aperture. The protrusion can be received in the holding aperture, and the cover impelled towards the housing until the pin is received into the receiving hole. As such, the cover securely engages the housing by protrusion seated in the holding aperture. However, the cover usually needs to be separated from the housing for removing a battery from the housing. Therefore, the cover may be easily lost.

Therefore, there is room for improvement within the art.

BRIEF DESCRIPTION OF THE DRAWINGS

Many aspects of the present battery cover mechanism can be better understood with reference to the following drawings. The components in the various drawings are not necessarily drawn to scale, the emphasis instead being placed upon clearly illustrating the principles of the present battery cover mechanism. Moreover, in the drawings, like reference numerals designate corresponding parts throughout the diagrams.

DETAILED DESCRIPTION OF THE EMBODIMENT

Figure 1:
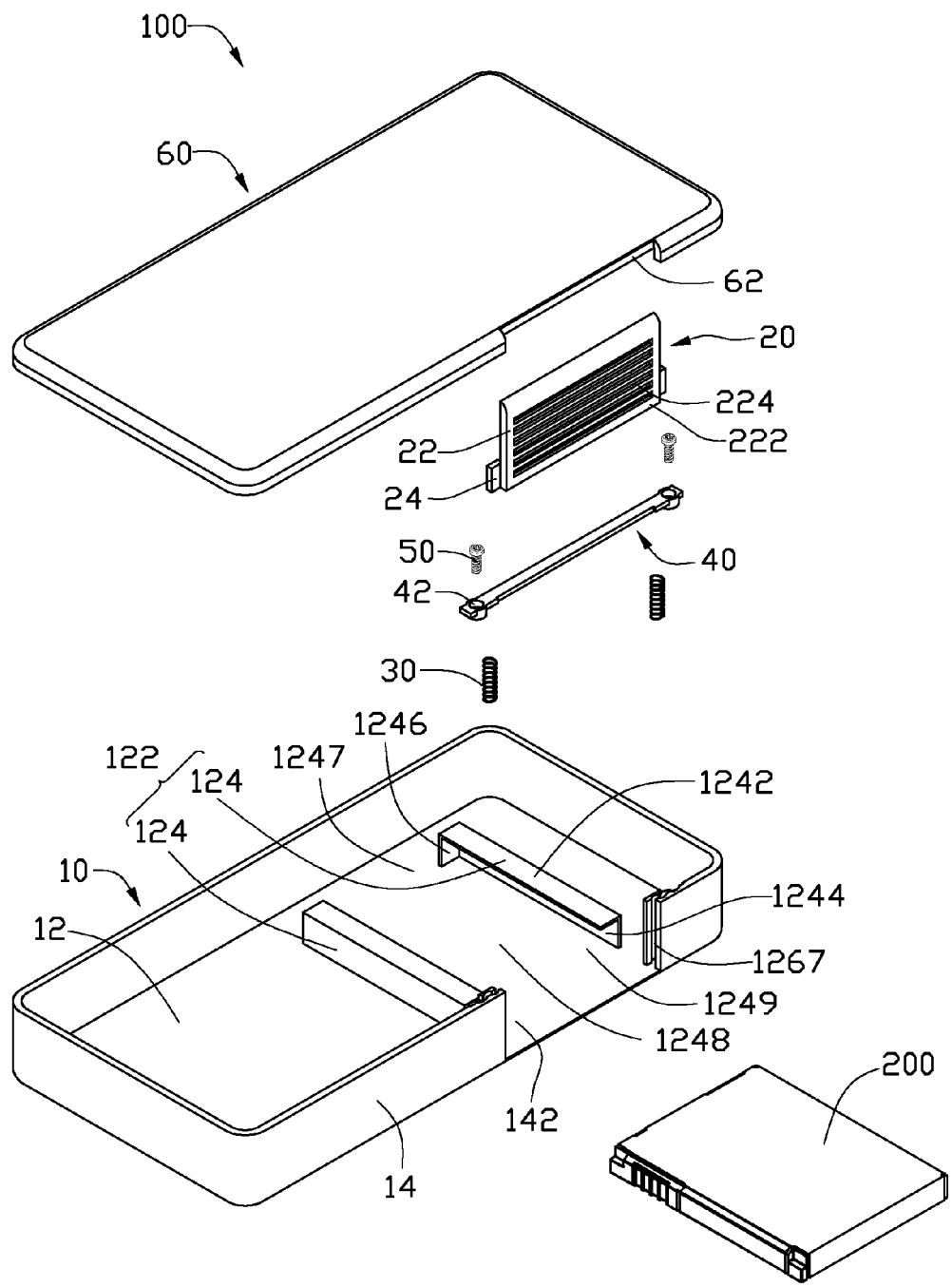
FIG. 1 is a disassembled view of the battery cover mechanism, according to an exemplary embodiment.

Referring to FIG. 1, the battery cover mechanism 100 can be used in mobile phones, and other portable electronic devices, such as personal digital assistants (PDAs), digital cameras, and others, for receiving a battery 200. The battery cover mechanism 100 includes a housing 10, a door 20, two elastic members 30, a holding unit 40, two fixing members 50, and a cover 60.

The housing 10 includes a bottom wall 12 and a peripheral wall 14 perpendicularly extending from the periphery of the bottom 12. The bottom wall 12 forms a holding frame unit 122. The holding frame unit 122 includes spaced-apart and oppositely shaped, parallel holding blocks 124. Each of the two holding blocks 124 is generally L-shaped and includes a top wall 1242 parallel with the bottom wall 12, a sidewall 1244 and an end wall 1246. The sidewall 1244 and the end wall 1246 connect with each other perpendicularly, and perpendicularly connect to the top wall 1242 and the bottom wall 12. The spaced apart holding blocks 124 and the bottom wall 12 enclose a receiving space 1248 defining a first opening 1247 and a second opening 1249. The receiving space 1248 is used to receive the battery 200. The first opening 1247 is defined by the two end walls 1246. The second opening 1249 is aligned opposite to the first opening 1247 and facilitates inserting the battery 200 into the receiving space 1248.

Figure 2:
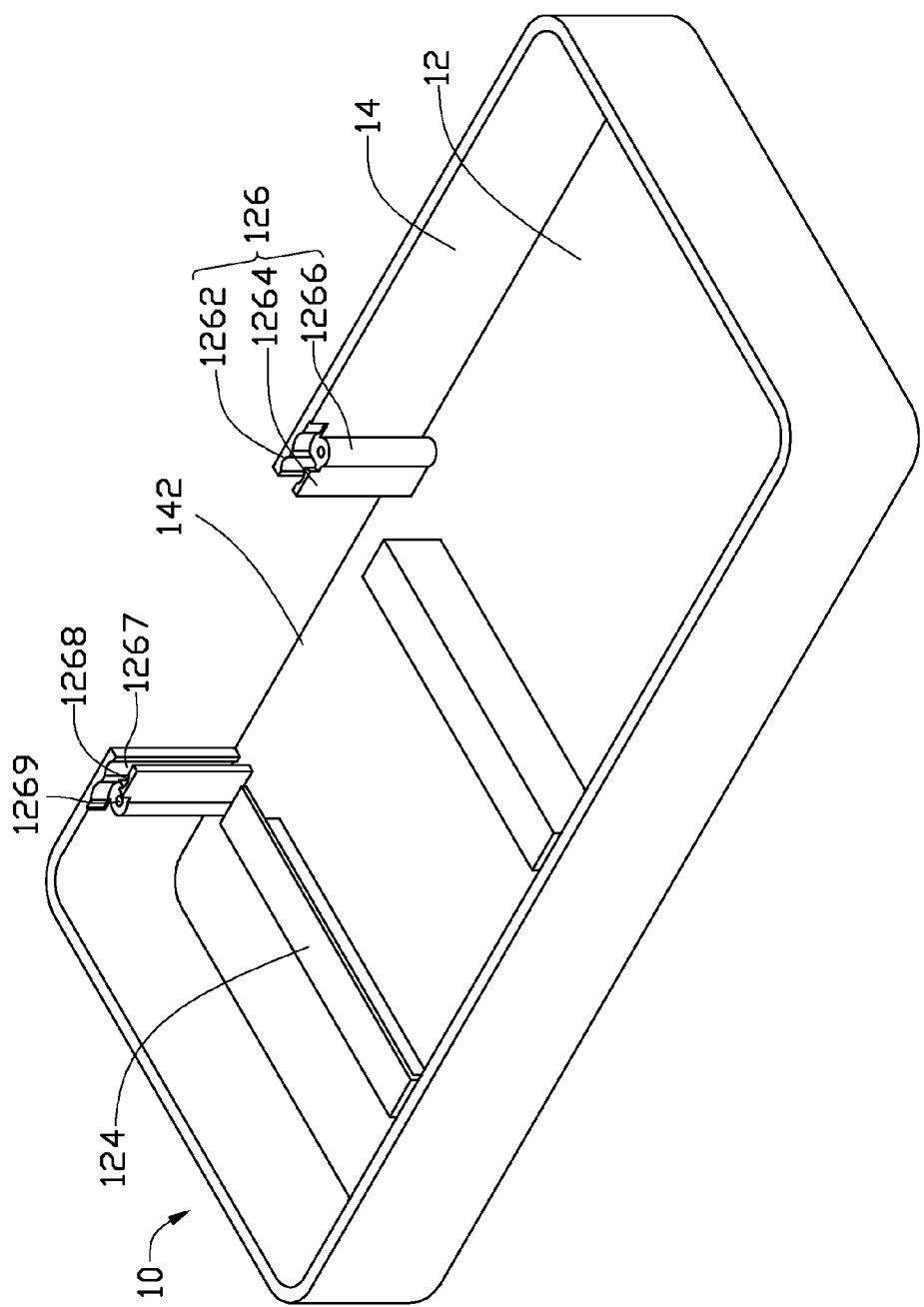
FIG. 2 is a schematic view of the housing of the battery cover mechanism shown in FIG. 1.

Referring to FIG. 2, the peripheral wall 14 defines a cutout 142. The cutout 142 is aligned with the second opening 1249 and facilitates passing the battery 200 through the cutout 142 and the second opening 1249 into the receiving space 1248. The bottom wall 12 further includes a latching seat 126 on each side of the cutout 142. Each of the latching seats 126 includes a first latching wall 1262, a second latching wall 1264, and a connecting body 1266. The first latching wall 1262 can be a portion of the peripheral wall 14 adjacent to the cutout 142. The second latching wall 1264 protrudes from the bottom wall 12 and extends in parallel with the first latching wall 1262. The connecting body 1266 is a pole connecting the first latching wall 1262 and the second latching wall 1264. Accordingly, two guiding slots 1267 are enclosed in the two latching seats 126. The guiding slot 1267 is used to engagingly receive the door 20. Each of the two guiding slots 1267 includes a chamber section 1268 for receiving one of the elastic members 30. The connecting body 1266 defines a first connecting hole 1269 for receiving the fixing member 50.

The door 20 includes a main board 22 and a rib 24 at each side of the main board 22. The main board 22 has a front surface 222 and a back surface (not labeled). The front surface 222 forms a plurality of strips 224 for providing friction when sliding the door 20. The two ribs 24 extend laterally from their respective sides of the back surface. The ribs 24 are used to slidably engage into the guiding slots 1267.

The elastic member 30 is a coil spring and can be received in the chamber section 1268 of the latching seat 126.

The holding unit 40 is a bar defining two second connecting holes 42 corresponding to the two first connecting holes 1269.

The fixing member 50 can be a screw passed through the second connecting hole 42 and screwed into the first connecting holes 1269 to fix the holding unit 40 to the housing 10. The holding unit 40 encloses the chamber section 1268 so that the elastic member 30 is resisted by the holding unit 40 in the chamber section 1268.

The cover 60 engages with the housing 10. The cover 60 defines a notch 62 in the periphery corresponding to the cutout 142 of the housing 10 and has the same width as the cutout 142. The notch 62 is engageable by the door 20.

To assemble the battery cover mechanism 100, the door 20 is mounted to the housing 10. The two ribs 24 of the door 20 are received into their respective guiding slots 1267 of the two latching seats 126 and positioned into their respective chamber sections 1268. The door 20 closes off the cutout 142 of the housing 10 until the ribs 24 reach to the bottom wall 12. Then, the elastic members 30 are placed into their respective chamber sections 1268 and the ends of the elastic members 30 resist their respective ribs 24. The other opposite ends of the elastic members 30 expose out of the chamber sections 1268. After that, the holding unit 40 is assembled in the housing 10, the two second connecting holes 42 of the holding unit 40 is aligned above the first connecting holes 1269 of the latching seat 126, the two fixing members 50 are passed through their respective second connecting holes 42 and screwed into their respective first connecting holes 1269, thereby, fixing the holding unit 40 with the housing 10. The elastic members 30 are compressed by the pressing of the holding unit 40. The ribs 24 are resisted by the elastic members 30. Finally, the cover 60 is assembled in the housing 10, e.g., by latching. The opening 62 of the cover 60 aligns with the cutout 142 of the housing 10, so the door 20 is received in the opening 62 and the cutout 142.

Figure 3:
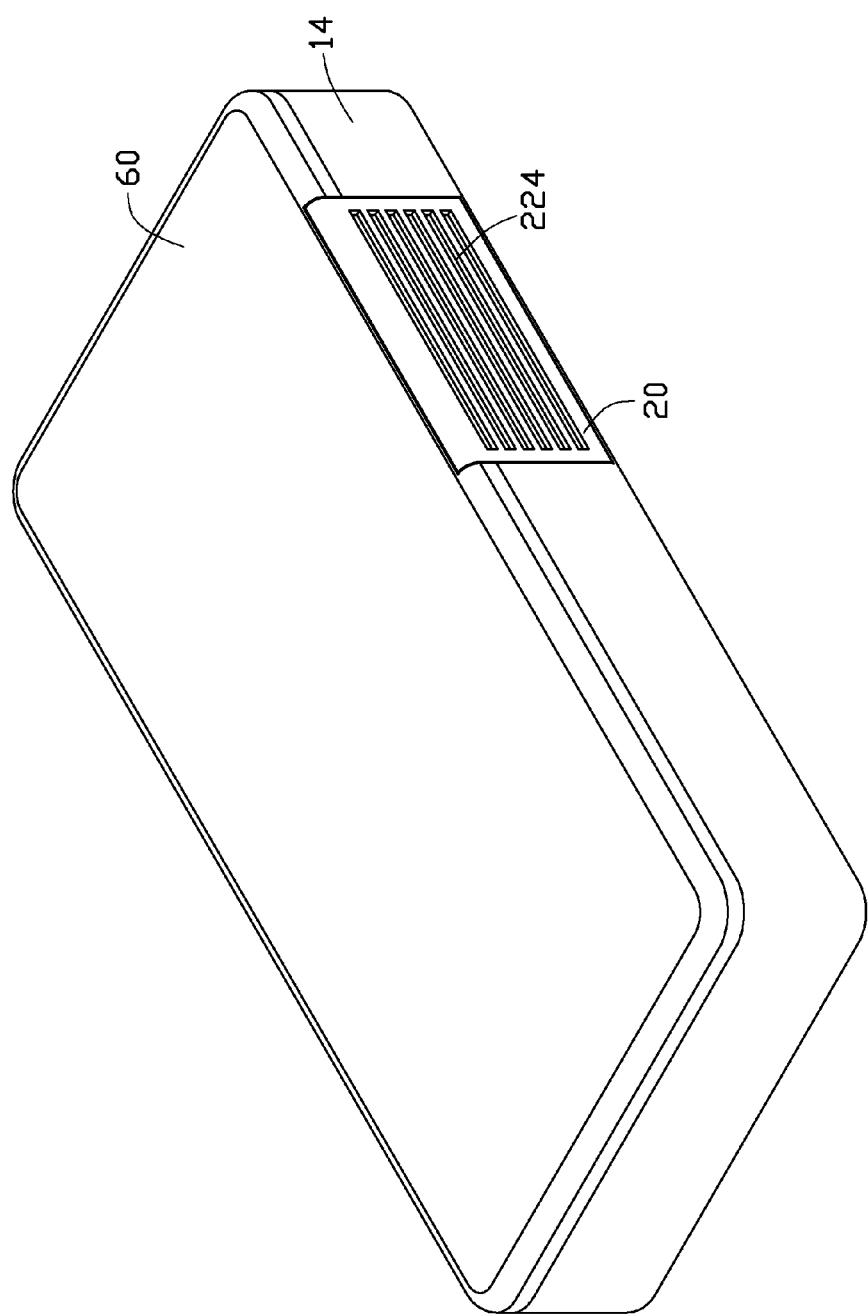
FIG. 3 is an assembled view of the battery cover mechanism shown in FIG. 1.
Figure 4:
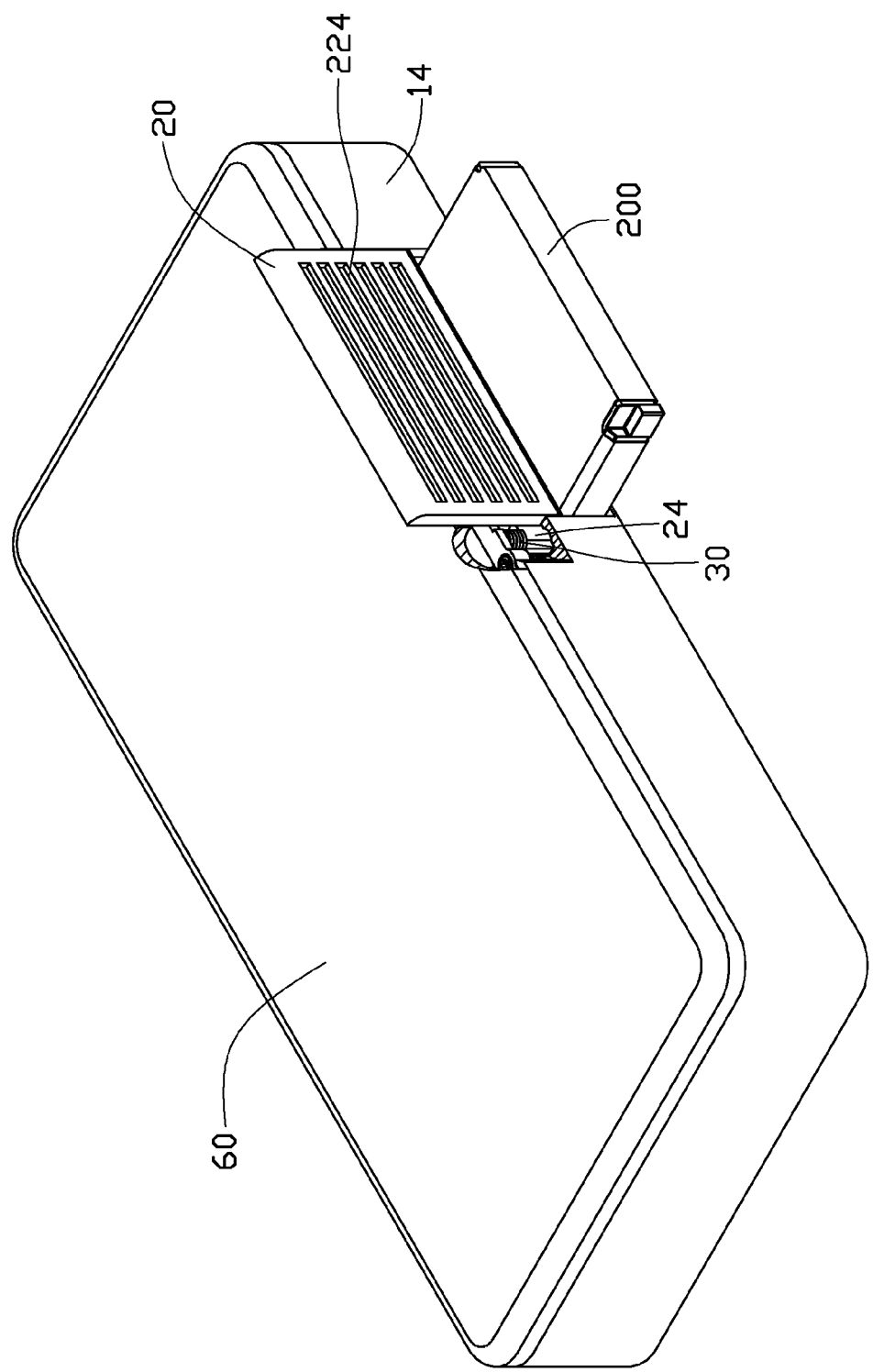
FIG. 4 is a schematic view of the battery cover mechanism shown in FIG. 1 in assembling a battery.

Referring to FIG. 3 and FIG. 4, to install the battery 200 by the battery cover mechanism 100, the door 20 is slid upwards with an external force away from the bottom of the latching seat 126 to expose the cutout 142. As a result, the ribs 24 slide accordingly and the elastic members 30 are further compressed. The battery 200 can be pushed through the cutout 142 and the second opening 1249 into the receiving space 1248 of the housing 10 until the end portions of the battery 200 contact the end walls 1246. Then, the external force on the door 20 is removed, releasing the door 20 to slide downwardly along the guiding slots 1267 by first elastic members 30. The cutout 142 is closed off again by the door 20, the battery 200 is latched within the holding frame unit 122 by the door 20, and thus cannot be removed out of the receiving space 1248. To remove the battery 200, the door 20 is pushed and slide upwardly to expose the cutout 142, thus the battery 200 can be freed from the receiving room 1242. Therefore, it is easy to take out the battery 200 without removing the door 20 entirely from the housing 10, preventing misplacing and losing the door 20.

It is understood that the holding unit 40 can be omitted, the cover 60 is assembled in the housing 10, and the elastic members 30 can be compressed by the cover 60 directly.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A battery cover mechanism for a portable electronic device, comprising:
    a housing having a peripheral wall and a bottom wall, wherein the peripheral wall defines a cutout, the bottom wall forms spaced-apart latching seats on opposites sides of the cutout and a holding frame towards the cutout, the two latching seats form spaced-apart guiding slots, the holding frame including two parallel holding blocks spaced from the peripheral wall, the holding blocks and the bottom wall enclosing a receiving space for receiving a battery;
    a door having a rib at each side thereof, each rib received in one of the guiding slots, the door slidably engaging with the two latching seat to close the cutout; two elastic members respectively positioned into the guiding slots; and
    a holding unit fixed to the two latching seats and enclosing the two elastic members in the guiding slots, each of elastic members is resisted between one of the ribs and the holding unit;
    wherein the door can slide along the guiding slots and be opened relative to the cutout by an external force, to assemble the battery into the receiving space
    wherein each holding block includes a top wall parallel with the bottom wall, and a sidewall and an end wall, the sidewall and the end wall connect with each other perpendicularly, and are perpendicularly connected to the top wall and the bottom wall, a first opening, and a second opening, the first opening and the second opening align with the cutout, the battery can pass through the cutout and the second opening enter into the receiving space.

2. The battery cover mechanism as claimed in claim 1, wherein each latching seat includes a first latching wall, a second latching wall and a connecting body, the first latching wall and the second latching wall are parallel, and the connecting body connects the first latching wall and the second latching wall to enclose the guiding slot.

3. The battery cover mechanism as claimed in claim 2, wherein the first latching wall is a portion of the peripheral wall adjacent to the cutout.

4. The battery cover mechanism as claimed in claim 2, wherein the guiding slot includes a chamber section to receive the elastic member.

5. The battery cover mechanism as claimed in claim 1, wherein each connecting body defines a first connecting hole, the holding unit defines two second connecting holes corresponding to the first connecting holes, a fixing member passes through each of the second connecting holes into their respective first connecting hole to fix the holding unit to the housing, the elastic members is compressed in the guiding slot by the holding unit.

6. The battery cover mechanism as claimed in claim 1, wherein the elastic member is a coil spring.

7. The battery cover mechanism as claimed in claim 1, wherein the door includes a main board and the two ribs laterally extending from the main board.

8. The battery cover mechanism as claimed in claim 1, wherein the battery cover mechanism includes a cover engaged with the housing, the cover defines a notch at the periphery and aligning with the cutout of the housing.

9. A battery cover mechanism for a portable electronic device, comprising:
    a housing having a peripheral wall and a bottom wall, wherein the peripheral wall defines a cutout, the bottom wall forms spaced-apart latching seats at each side of the cutout and a holding frame towards the cutout, the two latching seats form spaced-apart guiding slots, the holding frame including two parallel holding blocks spaced from the peripheral wall, the holding blocks and the bottom wall enclosing a receiving space for receiving a battery;
    a door having a rib at each side thereof, each rib received in one of the guiding slots, the door slidably engaging with the two latching seat to close the cutout;
    two elastic members respectively positioned into the guiding slots and abutting against the ribs;
    wherein when the door is slid along the guiding slots and the ribs elastically compress the elastic members, the door is opened relative to the cutout by an external force to assemble a battery into the holding frame;
    wherein each holding block includes a top wall parallel with the bottom wall, and a sidewall and an end wall, the sidewall and the end wall connect with each other perpendicularly, and are perpendicularly connected to the top wall and the bottom wall.

10. The battery cover mechanism as claimed in claim 9, wherein the battery cover mechanism includes a holding unit, the holding unit is fixed to the two latching seats and resist the two elastic members.

11. The battery cover mechanism as claimed in claim 10, wherein the holding unit is a bar, the holding unit defines two second connecting holes at the two ends thereof, two fixing members pass through the two second connecting holes to fix the holding unit with the two latching seats.

12. The battery cover mechanism as claimed in claim 9, wherein the elastic member is a coil spring.

13. The battery cover mechanism as claimed in claim 9, wherein a first opening and a second opening are defined between the holding blocks, the first opening and the second opening align with the cutout, the battery passes through the cutout and the second opening enter into the receiving space.

14. A portable electronic device comprising: a peripheral wall defining a cutout; a bottom wall including two spaced-apart latching seats and a holding frame, the latching seat perpendicularly formed ton the bottom wall and positioned on opposites sides of the cutout, the holding frame including two parallel holding blocks spaced from the peripheral wall for receiving a battery, the holding frame defining an opening between the holding blocks facing the cutout;

a door slidably engaging with the two latching seat for closing the cutout; two elastic members respectively positioned into the latching seat; and wherein when the door is slid along the latching seats along a direction perpendicular to the bottom wall, the elastic members are compressed, the door is opened relative to the cutout by an external force to assemble a battery into the holding frame;

wherein each holding block includes a top wall parallel with the bottom wall, and a sidewall and an end wall, the sidewall and the end wall connect with each other perpendicularly, and are perpendicularly connected to the top wall and the bottom wall.

\* \* \* \* \*